United States Patent [19]

Weir et al.

[11] 4,366,128
[45] Dec. 28, 1982

[54] REMOVAL OF ARSENIC FROM AQUEOUS SOLUTIONS

[75] Inventors: Donald R. Weir; Ian M. Masters, both of Fort Saskatchewan, Canada

[73] Assignee: Sherritt Gordon Mines Limited, Toronto, Canada

[21] Appl. No.: 192,766

[22] Filed: Oct. 1, 1980

[30] Foreign Application Priority Data

Aug. 22, 1980 [CA] Canada .................................. 358966

[51] Int. Cl.³ .............................................. C01G 28/02
[52] U.S. Cl. .................................... 423/87; 423/602; 423/11; 423/18; 423/8
[58] Field of Search ....................... 423/602, 87, 11, 18

[56] References Cited

U.S. PATENT DOCUMENTS 1,924,518  8/1933  Rushton ............................. 423/602
2,686,114  8/1954  McGauley et al. ................. 423/602
2,951,741  9/1960  Sill ....................................... 423/602
4,241,039 12/1980  Koh et al. ............................. 423/87
4,244,734  1/1981  Reynolds et al. ..................... 423/87
4,244,735  1/1981  Reynolds et al. ..................... 423/87

OTHER PUBLICATIONS

Jacobson, "Encyclopedia of Chemical Reactions", vol. 1, Reinhold Publishing Corp., N.Y., 1946, p. 472.

Primary Examiner—Herbert T. Carter
Attorney, Agent, or Firm—Robert F. Delbridge; Arne I. Fors

[57] ABSTRACT

A process for removing arsenic from an aqueous solution containing arsenic in the form of a soluble arsenate includes adjusting the pH of the solution if necessary to at least about 10, adding a soluble barium salt to precipitate arsenic as barium arsenate, and removing the precipitated barium arsenate from the solution.

14 Claims, 1 Drawing Figure

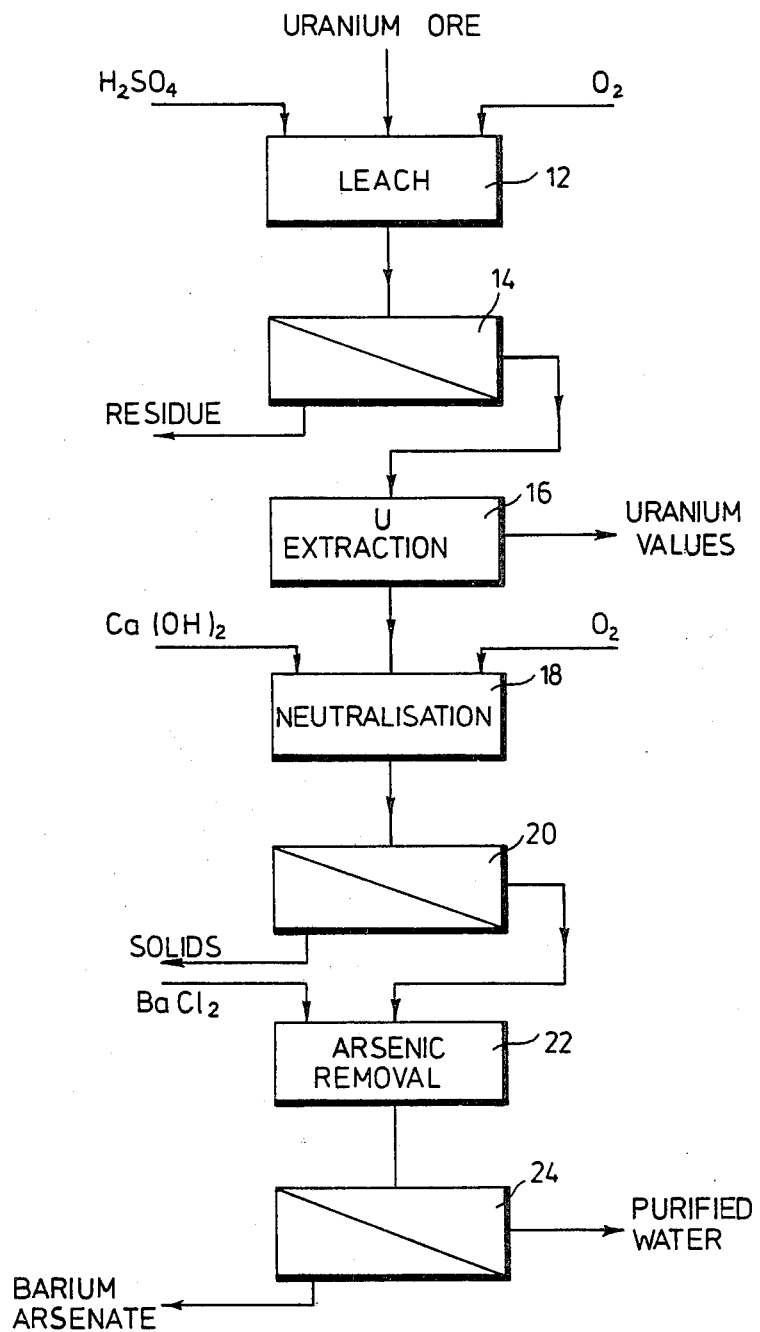

REMOVAL OF ARSENIC FROM AQUEOUS SOLUTIONS

This invention relates to the removal of traces of dissolved arsenic from aqueous solutions to reduce the dissolved arsenic concentration to very low values, for example less than 0.5 mg/L.

There are various industrial processes in which a waste aqueous solution contains arsenic whose concentration must be reduced to an extremely low level before the aqueous solution is considered safe for disposal by discharge to the environment. For example, in hydrometallurgical processes for the recovery of metals from their ores, the ore treated often contains arsenic which is dissolved during the hydrometallurgical operation. Although various methods are known for removing some arsenic from solution, known methods which are commercially acceptable are only able to reduce the concentration of dissolved arsenic to about 1 or 2 mg/L. However, environmental regulations in many places do not permit the discharge to the environment of water containing such concentrations of arsenic, but only permit discharge when the arsenic concentration is much lower, for example below 0.5 mg/L.

It is known to precipitate dissolved arsenic as calcium arsenate and/or ferric arsenate, for example by the addition of lime and/or ferric sulphate, in order to reduce the dissolved arsenic content of an aqueous solution from relatively high concentrations down to about 1 or 2 mg/L. However, the solubilities of calcium arsenate and ferric arsenate are such that it is not possible to reduce the dissolved arsenic concentration still further by this method.

The present invention is based on the discovery that the arsenic concentration in an aqueous solution containing dissolved arsenic in the form of a soluble arsenate, such as calcium arsenate and/or ferric arsenate, can be significantly reduced by adjusting the pH of the solution if necessary to at least 10, preferably to 11 or 12, and adding a soluble barium salt, such as barium chloride, to precipitate dissolved arsenic as barium arsenate. In this way, the dissolved arsenic concentration can be reduced to less than 0.5 mg/L and, at the preferred pH of 11 of 12, probably to less than 0.2 mg/L. The soluble barium salt may be added before, during or after the pH adjustment.

Preferably, any pH adjustment is carried out and any precipitate, formed as a result of the pH adjustment, is removed before addition of the soluble barium salt.

The invention may be used to remove dissolved arsenic from an acidic aqueous solution by raising the pH of the solution to at least about 3, preferably at least about 5 and more preferably at least about 7, and adding ions selected from the group consisting of calcium ions and ferric ions if necessary to precipitate some of the arsenic as at least one of the compounds selected from the group consisting of calcium arsenate and ferric arsenate, separating the precipitate from the remaining solution to provide an aqueous solution containing at least one dissolved arsenate selected from the group consisting of calcium arsenate and ferric arsenate, adjusting the pH of the solution if necessary to at least about 10, adding barium chloride to precipitate arsenic as barium arsenate, and separating the precipitated barium arsenate from the solution.

The invention is especially useful in the recovery of uranium from uranium ores which also contain arsenic and iron.

One embodiment of the invention will now be described, by way of example, with reference to the accompanying drawing which shows a flow diagram of a uranium recovery process.

Referring to the drawing, a uranium-bearing ore of a sulphidic nature which also contains arsenic and iron in addition to other impurities is leached in aqueous sulphuric acid solution under oxidizing conditions in leach step 12. The leached slurry is subjected to a liquid-solids separation step 14 where the undissolved residue is removed for disposal as desired, for example by inclusion in the neutralization step which will be described later. The leach solution proceeds to a uranium extraction step 16 where uranium values are extracted from the leach solution, for example by solvent extraction.

The remaining solution containing dissolved arsenic and other impurities including iron then proceeds to a neutralization step 18 where lime is added to raise the pH of the solution to about 11 or 12 to cause precipitation of most of the dissolved impurities. In particular, most of the arsenic precipitates as calcium arsenate and/or ferric arsenate. Oxygen is bubbled into the solution during this step to oxidize any arsenite ions to arsenate ions. As mentioned above, the residue from the liquid-solids separation step 14 may be fed to this neutralization step. The resultant slurry passes to a further liquid-solids separation step 20, from which the solids may be dealt with as desired.

The aqueous liquid leaving the separation step 20 still contains small amounts of various impurities including arsenic as dissolved calcium arsenate and ferric arsenate, the arsenic concentration being about 1 or 2 mg/L. Since this arsenic concentration is too high to permit discharge of the aqueous liquid to the environment, the liquid is treated in an arsenic removal step 22 in accordance with the invention where barium chloride solution is added to precipitate much of the remaining arsenic as barium arsenate. In the arsenic removal step 22, the pH of the liquid is about 11 or 12 as a result of the lime treatment in the neutralization step 18. In this manner, the arsenic concentration is reduced to less than 0.5 mg/L, and can be reduced to as low as 0.1 mg/L.

The precipitated barium arsenate is removed from the liquid in a subsequent liquid-solids separation step 24, and the separated liquid now qualifies as purified water which can be discharged to the environment. The separated barium arsenate can be dealt with as desired.

An example of the invention will now be described.

EXAMPLE

Solution from a uranium extraction step, from which uranium had been extracted by solvent extraction, was treated with lime in a neutralization step to raise the pH to 11.6 and the resultant precipitate was separated from the remaining solution by settling. The concentrations (in mg/L) of various impurities in the solution before and after the neutralization step are shown in Table 1.

TABLE 1

| Impurities | Before Neutralization | After Neutralization |
| --- | --- | --- |
| Arsenic | 1940 | 1.2 |
| Nickel | 2850 | 0.2 |
| Iron | 2680 | <0.1 |

TABLE 1-continued

| Impurities | Before Neutralization | After Neutralization |
| --- | --- | --- |
| Aluminum | 1250 | 0.4 |
| Magnesium | 1180 | 0.2 |
| Sulphur | 13400 | 550 |

The arsenic concentration of 1.2 mg/L after neutralization is too high to permit the solution to be discharged to the environment. Different portions of the solution were treated with barium chloride at different concentrations and temperatures. The resultant barium arsenate precipitate was removed in each case by filtration and the arsenic concentrations in the resultant liquids were determined. The results are shown in Table 2.

TABLE 2

| Barium Conc. | Temp (°C.) | Initial pH | Final pH | Arsenic Conc. |
| --- | --- | --- | --- | --- |
| 100 | 25 | 11.6 | 11.5 | 0.1 |
| 200 | 25 | 11.6 | 11.4 | 0.1 |
| 50 | 50 | 11.6 | 11.6 | 0.1 |
| 100 | 50 | 11.6 | 11.2 | 0.1 |
| 200 | 50 | 11.6 | 11.2 | 0.1 |

It will be observed that in all these tests the arsenic concentration was reduced to 0.1 mg/L.

Other embodiments and examples will be readily apparent to a person skilled in the art, the scope of the invention being defined in the appended claims.

What we claim as new and desire to protect by Letters Patent of the United States is:

1. A process for removing arsenic from an aqueous solution containing arsenic in the form of a soluble arsenate selected from the group consisting of calcium arsenate and ferric arsenate, comprising ensuring that the pH of the solution is at least about 10, adding a soluble barium salt to precipitate arsenic as barium arsenate, and removing the precipitated barium arsenate from the solution.

2. A solution according to claim 1 comprising ensuring that the pH of the solution is in the range of from about 11 to about 12.

3. A process according to claim 1 wherein the aqueous solution contains at least 1 mg/L dissolved arsenic, and the addition of barium chloride to precipitate barium arsenate reduces the concentration of dissolved arsenic to less than 0.5 mg/L.

4. A process according to claim 1 wherein the aqueous solution contains at least 0.5 mg/L dissolved arsenic, and addition of barium chloride to precipitate barium arsenate reduces the concentration of dissolved arsenic to less than 0.2 mg/L.

5. A process according to claim 1 wherein the soluble barium salt is barium chloride.

6. A process according to claim 1 wherein the pH of the solution is adjusted to at least about 10 from a lower value and any precipitate formed as a result of pH adjustment is separated from the solution before addition of the soluble barium salt.

7. A process for removing dissolved arsenic from an acidic aqueous solution comprising raising the pH of the solution to at least about 3 and adding ions selected from the group consisting of calcium ions and ferric ions to precipitate some of the arsenic as at least one of the compounds selected from the group consisting of calcium arsenate and ferric arsenate, separating the precipitate from the remaining solution to provide an aqueous solution containing at least one dissolved arsenate selected from the group consisting of calcium arsenate and ferric arsenate, ensuring that the pH of the solution is at least about 10, adding barium chloride to precipitate arsenic as barium arsenate, and separating the precipitated barium arsenate from the solution.

8. A process according to claim 7 comprising ensuring that the solution containing at least one dissolved arsenate is in the range of from about 11 to about 12.

9. A process according to claim 7 wherein the solution containing at least one dissolved arsenate contains at least 1 mg/L dissolved arsenic and the addition of barium chloride to precipitate barium arsenate reduces the concentration of dissolved arsenic to less than 0.5 mg/L.

10. A process according to claim 7 wherein the solution containing at least one dissolved arsenate contains at least 0.5 mg/L dissolved arsenic, and the addition of barium chloride to precipitate barium arsenate reduces the concentration of dissolved arsenic to less than 0.2 mg/L.

11. A process according to claim 7 wherein the pH of the acidic aqueous solution is raised to at least about 5 to precipitate some of the arsenic.

12. A process according to claim 7 wherein the pH of the acidic aqueous solution is raised to at least about 7 to precipitate some of the arsenic.

13. A process according to claim 7 including supplying oxygen to the acidic aqueous solution during the first mentioned arsenate precipitation step to oxidize arsenite ions to arsenate ions.

14. A process according to claim 7 wherein the pH of the solution containing at least one dissolved arsenate is adjusted to at least about 10 from a lower value and any precipitate formed as a result of pH adjustment is separated from the solution before addition of the soluble barium salt.

* * * * *